United States Patent
Kobayashi et al.

(10) Patent No.: US 9,203,742 B2
(45) Date of Patent: *Dec. 1, 2015

(54) NETWORK SYSTEM AND FRAME COMMUNICATION METHOD

(75) Inventors: Noriaki Kobayashi, Tokyo (JP); Kiyohisa Ichino, Tokyo (JP); Satoshi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 13/824,297

(22) PCT Filed: Jun. 22, 2011

(86) PCT No.: PCT/JP2011/003565
§ 371 (c)(1),
(2), (4) Date: Mar. 15, 2013

(87) PCT Pub. No.: WO2012/035689
PCT Pub. Date: Mar. 22, 2012

(65) Prior Publication Data
US 2013/0182711 A1  Jul. 18, 2013

(30) Foreign Application Priority Data
Sep. 16, 2010  (JP) .................. 2010-208048

(51) Int. Cl.
*H04L 12/725* (2013.01)
*H04L 12/66* (2006.01)

(52) U.S. Cl.
CPC .............. *H04L 45/304* (2013.01); *H04L 12/66* (2013.01)
USPC ........................................ 370/392

(58) Field of Classification Search
USPC ........................................ 370/312
See application file for complete search history.

(56) References Cited

U.S. PATENT DOCUMENTS 7,558,264 B1  7/2009  Lolayekar et al.
8,514,856 B1  8/2013  Gai et al.
(Continued)

FOREIGN PATENT DOCUMENTS

JP  2010-141443  6/2010
WO  WO 01/91345 A1  11/2001

OTHER PUBLICATIONS

PCT/ISA/237 ( English translation of written opinion of the international searching authority, dated Jul. 19, 2011).
(Continued)

*Primary Examiner* — Jenee Williams
(74) *Attorney, Agent, or Firm* — McGinn IP Law Group, PLLC

(57) ABSTRACT

A network system has: a communication device configured to perform frame transmission and reception; a network configured to transfer the frame; a gateway connected between the communication device and the network; and a controller configured to perform management of the communication device and the network. The frame is classified into a control frame for communicating control information necessary for communication and a data frame for communicating data between communication devices. The gateway determines whether a frame received from a source communication device is the control frame or the data frame, forwards the control frame to the controller, and forwards the data frame to the network. The controller performs the management based on the control frame received from the gateway. The network transfers the data frame received from the gateway to a destination communication device without through the controller.

4 Claims, 13 Drawing Sheets

(56) References Cited

U.S. PATENT DOCUMENTS

| | | | | |
|---|---|---|---|---|
| 2002/0194367 | A1* | 12/2002 | Nakamura et al. | 709/238 |
| 2003/0012196 | A1* | 1/2003 | Ramakrishnan | 370/390 |
| 2003/0046396 | A1* | 3/2003 | Richter et al. | 709/226 |
| 2003/0206542 | A1* | 11/2003 | Holder | 370/338 |
| 2003/0223414 | A1* | 12/2003 | Wong | 370/389 |
| 2004/0054902 | A1* | 3/2004 | Fujimoto et al. | 370/338 |
| 2004/0105415 | A1* | 6/2004 | Fujiwara et al. | 370/338 |
| 2005/0021600 | A1* | 1/2005 | Lagosanto et al. | 709/203 |
| 2005/0226165 | A1 | 10/2005 | Pope et al. | |
| 2008/0159260 | A1 | 7/2008 | Vobbilisetty et al. | |
| 2008/0209300 | A1 | 8/2008 | Fukushima et al. | |
| 2008/0240106 | A1* | 10/2008 | Schlenk | 370/392 |
| 2010/0061242 | A1* | 3/2010 | Sindhu et al. | 370/235 |
| 2010/0061383 | A1 | 3/2010 | Rupanagunta et al. | |
| 2010/0061391 | A1* | 3/2010 | Sindhu et al. | 370/412 |
| 2010/0061394 | A1* | 3/2010 | Sindhu et al. | 370/422 |
| 2010/0142545 | A1 | 6/2010 | Kurita | |
| 2010/0177637 | A1* | 7/2010 | Kadambi et al. | 370/235 |
| 2011/0058573 | A1* | 3/2011 | Balakavi et al. | 370/463 |
| 2011/0262134 | A1* | 10/2011 | Armstrong et al. | 398/45 |
| 2011/0286342 | A1* | 11/2011 | Ee et al. | 370/252 |
| 2012/0026868 | A1* | 2/2012 | Chang et al. | 370/230 |
| 2012/0039163 | A1* | 2/2012 | Nakajima | 370/217 |
| 2012/0177042 | A1* | 7/2012 | Berman | 370/392 |
| 2012/0177045 | A1* | 7/2012 | Berman | 370/392 |
| 2012/0177370 | A1* | 7/2012 | Berman | 398/58 |

OTHER PUBLICATIONS

PCT/JP2011/03565, International Preliminary Report, Mar. 19, 2013 PCT/IB/373.

International Search Report (ISR) (PCT Form PCT/ISA/210), in PCT/JP2011/003565, dated Jul. 19, 2011.

INCITS TC T11, Fibre Channel Backbone-5 Rev 2.00, Jun. 4, 2009 http://www.fcoe.com/09-056v5.pdf.

United States Office Action dated Dec. 22, 2014 in copending U.S. Appl. No. 13/824,765.

Gary Lee, "Ethernet Technology Summit, Ethernet Fabric Requirements for FCoE in the Data Center", Feb. 2010, pp. 1-14, URL: http://www.bswd.com/ETS10/ETS10-Lee.pdf.

Satoshi Kamiya, et al., "Proposal for Extension of Fibre Channel ove Ethernet: 'Advanced FCoE'", IEICE, 2010.

Japanese Office Action dated Nov. 4, 2014 with a partial English translation.

English translation of PCT/ISA/237 (written opinion of the International Searching Authority, dated Oct. 11, 2011) in PCT/JP2011/004968.

PCT/IB/373 dated May 7, 2013 in PCT/JP2011/004968.

International Search Report (ISR) (PCT Form PCT/ISA/210), in PCT/JP2011/004968, dated Oct. 11, 2011.

United States Notice of Allowance dated Jun. 23, 2015 in co-pending U.S. Appl. No. 13/824,765.

* cited by examiner

Fig. 13

110: ADDRESS CONVERSION TABLE

| COMMUNICATION DEVICE \ ADDRESS | CONVERSION-TARGET ADDRESS 121 | CONVERSION-TARGET ADDRESS 122 |
|---|---|---|
| COMMUNICATION DEVICE 1 | 00:11:22:33:44:55 | 0e:fc:00:01:00:00 |
| COMMUNICATION DEVICE 2 | 00:11:66:77:88:99 | 0e:fc:00:01:00:01 |
| ⋮ | ⋮ | ⋮ |

NETWORK SYSTEM AND FRAME COMMUNICATION METHOD

TECHNICAL FIELD

The present invention relates to a network system that performs frame communication.

BACKGROUND ART

One of technologies for performing communication on a network is "data encapsulation". The details are as follows.

A data transferred between networks constitutes its form in accordance with a communication system used at the time of the transfer. The communication on the network is performed through a plurality of layers, as represented by OSI Reference Model and TCP/IP stack. Therefore, the form of the data needs to be capable of supporting specification of each layer. In general, a data consists of a header and a payload. The header includes a content that serves as a control data at a specific layer, and a communication standard at that layer interprets the content of the header to forward the payload to another layer. At each layer, the header is added ahead of the payload at a time of transmission and the header is removed at a time of reception. Therefore, the payload includes a content that can serve as the header at an upper layer. When a data communication is initiated, a data is generated from the top layer of the communication system. The data passes through lower layers one after another, passes through the bottom layer and then is output to the network. Before the data reaches the bottom layer, the header associated with each layer is added to the data and a portion being the header at the upper layer is treated as the payload. The addition of the header thus performed is called the data encapsulation.

The data encapsulation can be regarded as a technique that makes it possible by adding the header associated with a specific communication system to communicate with the communication system with which communication has not been available. By the application of this technique, it is possible to improve data security and to create a new communication system that can support a plurality of existing communication systems.

A new communication system that utilizes this technique is described in Non-Patent Literature 1. According to Non-Patent Literature 1, "Fibre Channel Over Ethernet (FCoE)" is proposed as one technique for a recent data center.

A recent data center is operated with a network configuration in which Storage Area Network (SAN) as represented by Fibre Channel (FC) and Local Area Network (LAN) as represented by Ethernet (registered trade mark) are mixed. Since separate networks are mixed, management costs and device costs are rising, which is a problem.

Because of this situation, the FCoE has been proposed. According to the FCoE, an FC data is encapsulated by using an Ethernet header and a newly-defined FCoE header. As a result, it is possible to integrate the communication system into the Ethernet system and to achieve a network configuration that the SAN and the LAN are integrated. Since uniform management and devices can be achieved on the integrated network, the FCoE is considered as a promising technique for solving the problem.

However, according to the current FCoE, the communication needs to invariably go through an FCoE communication-dedicated switch that is called an "FCoE Forwarder (FCF)". This causes constraint on network flexibility and extensibility. Therefore, it is not possible to deal with the data center configuration that utilizes a large number of communication devices.

CITATION LIST

Non Patent Literature

[NPL 1] INCITS TC T11, Fibre Channel Backbone-5, http://www.fcoe.com/09-056v5.pdf

SUMMARY OF INVENTION

In the communication system described in Non-Patent Literature 1, there exists a device through which frames invariably go at a time of communication. This causes deterioration of network flexibility and extensibility.

An object of the present invention is to provide a technique that can improve network flexibility and extensibility.

In an aspect of the present invention, a network system is provided. The network system has: a communication device configured to perform transmission and reception of a frame; a network configured to transfer the frame; a gateway connected between the communication device and the network; and a controller configured to perform management of the communication device and the network. The frame is classified into a control frame for communicating control information necessary for communication and a data frame for communicating data between communication devices. The gateway determines whether a frame received from the communication device as a source is the control frame or the data frame, forwards the control frame to the controller, and forwards the data frame to the network. The controller performs the management based on the control frame received from the gateway. The network transfers the data frame received from the gateway to the communication device as a destination without through the controller.

In another aspect of the present invention, a frame communication method in a network system is provided. The network system has: a communication device configured to perform transmission and reception of a frame; a network configured to transfer the frame; and a controller configured to perform management of the communication device and the network. The frame is classified into a control frame for communicating control information necessary for communication and a data frame for communicating data between communication devices. The frame communication method includes: (A) determining whether a frame transmitted from the communication device as a source is the control frame or the data frame; (B) forwarding the control frame to the controller and performing, in the controller, the management based on the control frame; and (C) forwarding the data frame to the network and transferring the data frame to the communication device as a destination without through the controller.

According to the present invention, frames transmitted from the communication device are divided into the control frames and the data frames. The data frames whose amount of information is enormous as compared with the control frames are transferred without through a specific route. That is, the communication system according to the present invention is freed from the constraint that there exists a device through which the data frames, which greatly contributes to network performance, invariably go. It is therefore possible to improve network flexibility and extensibility.

BRIEF DESCRIPTION OF DRAWINGS

FIG. 13 is a diagram showing a configuration example of an address conversion table in the modification example of the gateway according to the exemplary embodiment of the present invention.

DESCRIPTION OF EMBODIMENTS

Exemplary embodiments of the present invention will be described with reference to the attached drawings.

1. Configuration

Figure 1:
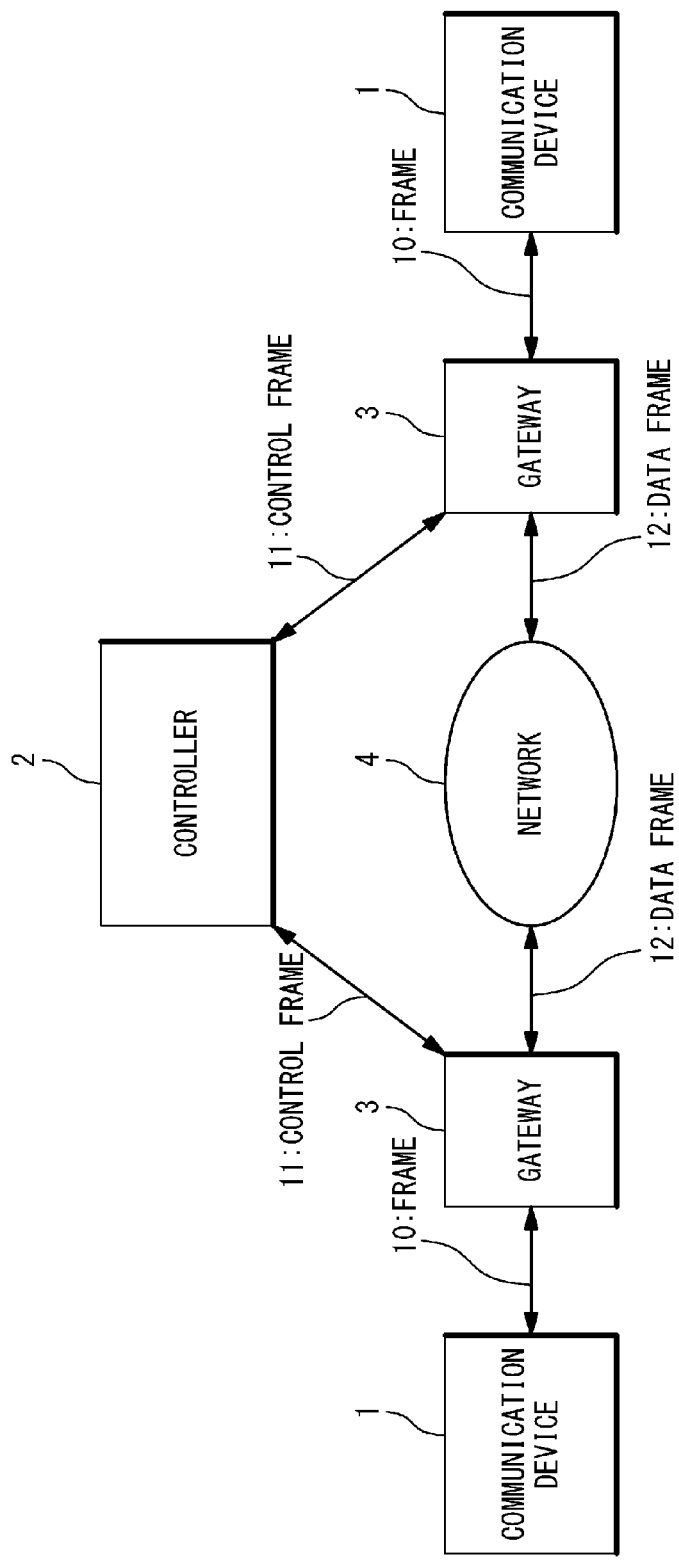
FIG. 1 is a block diagram showing a configuration of a network system according to an exemplary embodiment of the present invention.

FIG. 1 is a block diagram showing a configuration of a network system according to the present exemplary embodiment. The network system according to the present exemplary embodiment has a communication device 1, a controller 2, a gateway 3 and a network 4. The communication device 1 is connected to the gateway 3. The gateway 3 is connected between the communication device 1 and the network 4. The controller 2 is connected to each gateway 3.

The communication device 1 performs transmission and reception of frames 10. The frames 10 are classified into control frames 11 and data frames 12. The control frame 11 is a frame 10 used for communicating control information necessary for communication. For example, the control frame 11 is used for accessing to a communication network, logging-in a device and exchanging information for it. On the other hand, the data frame 12 is a frame 10 used for data transmission and reception between the communication devices 1. It should be noted here that the amount of information of the data frames 12 is enormous as compared with that of the control frames 11. It is possible to discriminate the control frame 11 and the data frame 12 based on a frame type of the frame 10.

The network 4 transfers the frames 10 that are communicated between the communication devices 1. The network 4 is configured by a combination of connection devices such as switches that relay frames and network cables connecting between the connection devices.

The gateway 3 and the communication device 1 are configured in pairs. The gateway 3 receives a frame 10 transmitted from the communication device 1 and determines whether the received frame 10 is a control frame 11 or a data frame 12. Then, the gateway 3 forwards the control frame 11 to the controller 2 and forwards the data frame 12 to the network 4. That is, the data frames 12 whose amount of information is enormous are transferred by the network 4 to a destination without going through the controller 2. Moreover, the gateway 3 receives a frame 10 (control frame 11, data frame 12) from the controller 2 and the network 4 and forwards the received frame 10 to the communication device 1. It should be noted that the gateway 3, when forwarding the frame 10, changes information of the frame 10 as necessary such that the destination device can treat the frame 10 correctly. The details will be described later.

The controller 2 receives the control frame 11 from the gateway 3 and treats the control frame 11. More specifically, the controller 2 performs management of information regarding the communication device 1 and the network 4, based on contents of the received control frame 11. Moreover, the controller 2 transmits or forwards the frame 10 to the communication device 1 and the gateway 3, as necessary.

Figure 2:
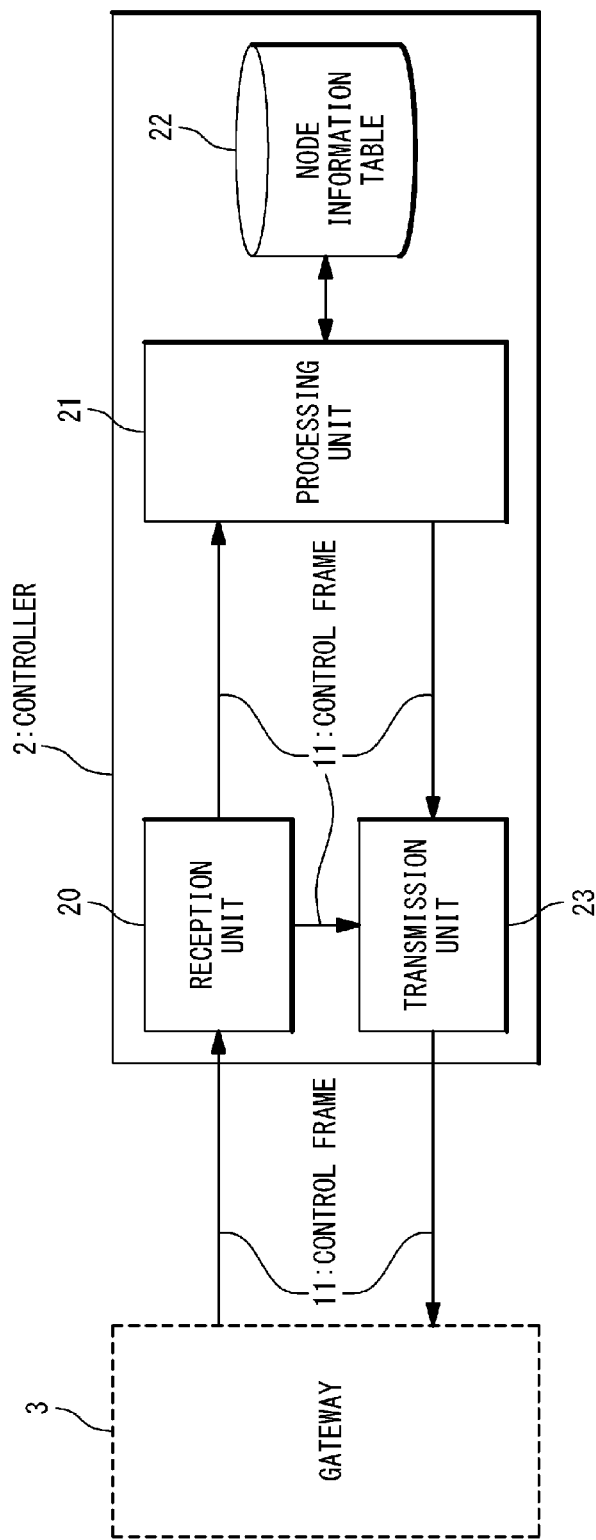
FIG. 2 is a block diagram showing a configuration of a controller according to the exemplary embodiment of the present invention.

A configuration of the controller 2 will be described below in detail. FIG. 2 is a block diagram showing a configuration of the controller 2. The controller 2 has a reception unit 20, a processing unit 21, a node information table 22 and a transmission unit 23.

The node information table 22 indicates management information regarding the communication device 1, the gateway 3 and the connection devices on the network 4. The reception unit 20 receives the control frame 11 from the gateway 3 and forwards the control frame 11 to the processing unit 21. The processing unit 21 performs processing according to contents of the received control frame 11. For example, the processing unit 21 updates the node information table 22 according to contents of the control frame 11. Also, the processing unit 21 generates a reply control frame 11 by referring to the node information table 22 and outputs the reply control frame 11 to the transmission unit 23. Also, the processing unit 21 forwards the received control frame 11 as it is to the transmission unit 23. The transmission unit 23 transmits the control frame 11 received from the processing unit 21 to a target gateway 3.

Figure 3:
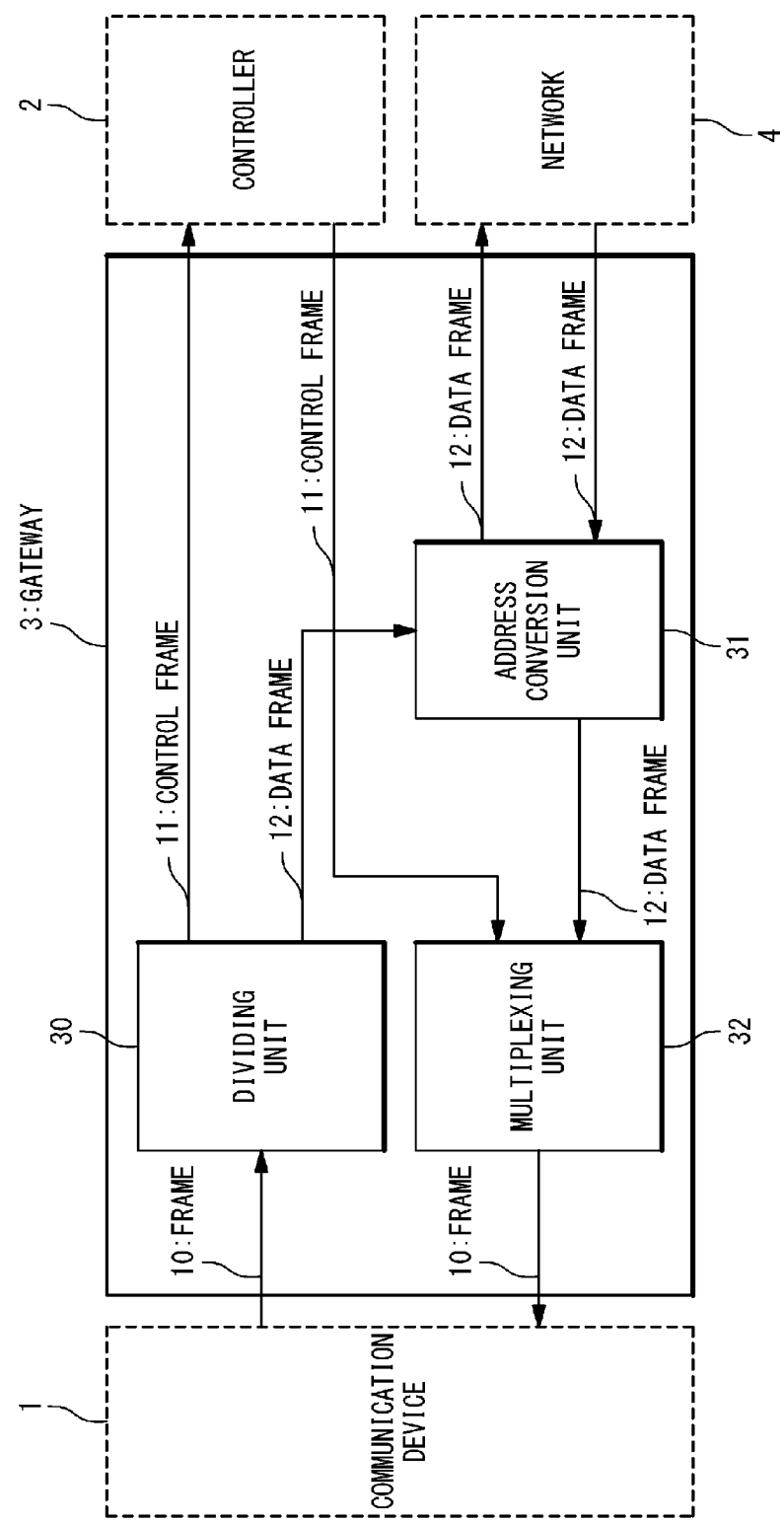
FIG. 3 is a block diagram showing a configuration of a gateway according to the exemplary embodiment of the present invention.

A configuration of the gateway 3 will be described below in detail. FIG. 3 is a block diagram showing a configuration of the gateway 3. The gateway 3 has a dividing unit 30, an address conversion unit 31 and a multiplexing unit 32.

The dividing unit 30 receives a frame 10 from the communication device 1. The dividing unit 30 analyzes the received frame 10 to determine whether the frame 10 is a control frame 11 or a data frame 12. Then, the dividing unit 30 forwards the control frame 11 to the controller 2 and forwards the data frame 12 to the address conversion unit 31. The address conversion unit 31 converts a destination MAC address of the data frame 12 received from the dividing unit 30 and then forwards the data frame 12 to the network 4. Moreover, when receiving a data frame 12 from the network 4, the address conversion unit 31 converts a source MAC address of the received data frame 12 and then outputs the data frame 12 to the multiplexing unit 32. The multiplexing unit 32 outputs the control frame 11 input from the controller 2 and the data frame 12 input from the address conversion unit 31 to the communication device 1.

According to the present exemplary embodiment, as described above, the frames 10 transmitted from the communication device 1 are divided into the control frames 11 and the data frames 12. The data frames 12 whose amount of information is enormous as compared with the control frames 11 are transferred without through a specific route (controller 2). That is, the communication system according to the present exemplary embodiment is freed from the constraint that there exists a device through which the data frames 12, which greatly contributes to network performance, invariably go. It is therefore possible to improve network flexibility and extensibility.

2. Operation Flow of Controller 2

Figure 4:
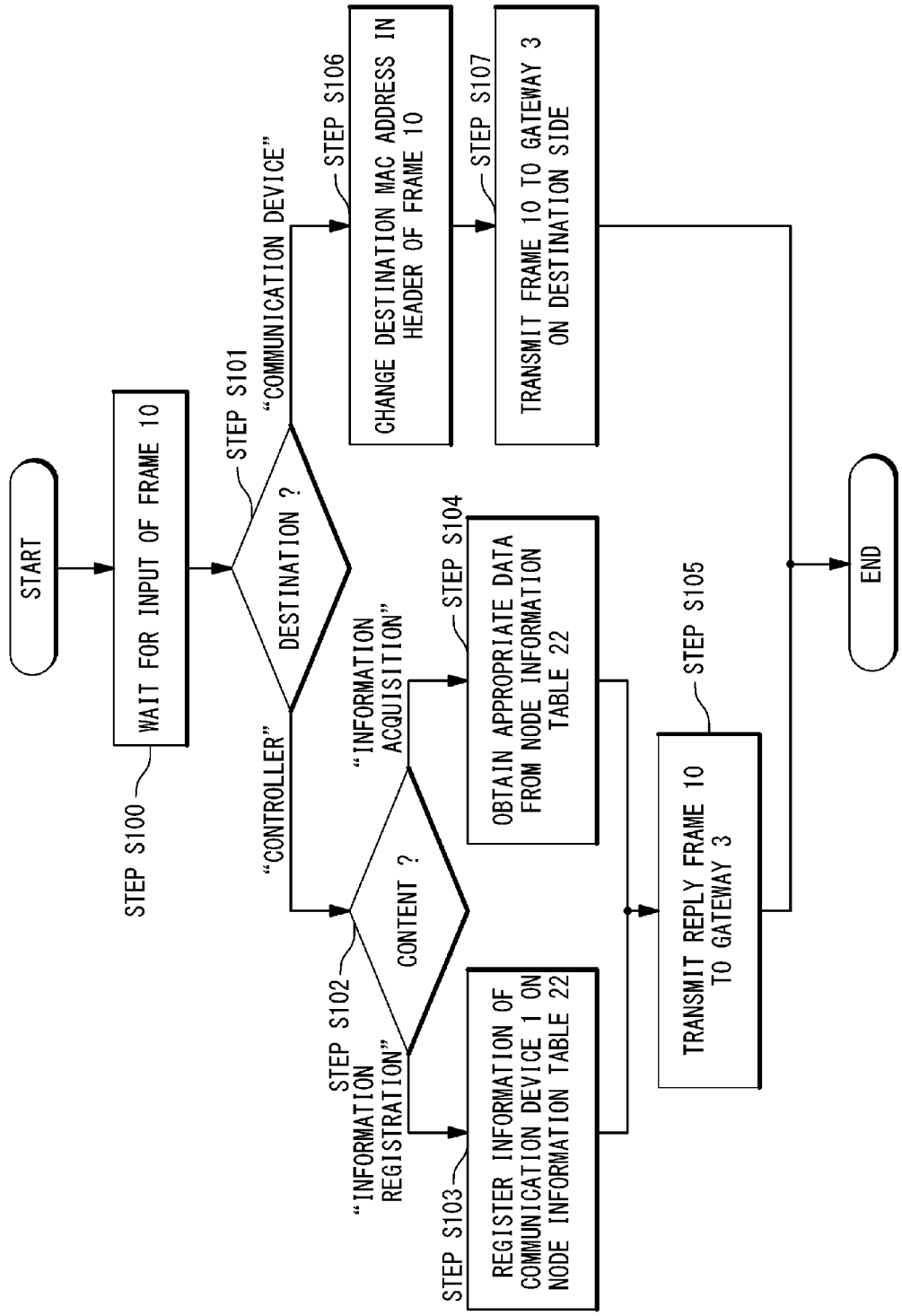
FIG. 4 is a flow chart showing an operation of a controller according to the exemplary embodiment of the present invention.

FIG. 4 is a flow chart showing an operation of the controller 2 according to the present exemplary embodiment. An operation flow of the controller 2 will be described below with reference to FIG. 2 and FIG. 4.

Step S100:
The processing unit 21 waits for input of the frame 10 (control frame 11) from the reception unit 20.

Step S101:
The processing unit 21 refers to a header and a payload of the frame 10 received from the reception unit 20 to determine whether the destination (terminal) of the frame 10 is the controller 2 or a communication device 1 on the opposite side of the source. If the destination is the controller 2, the processing proceeds to Step S102. On the other hand, if the destination is the communication device 1, the processing proceeds to Step S106.

Step S102:
The processing unit 21 determines a type of the frame 10. More specifically, the processing unit 21 determines whether the frame 10 is one (information registration frame) for registering information of the source communication device 1 or one (information acquisition frame) for acquiring information of another communication device 1 or the controller 2. In the case of the information registration frame, the processing proceeds to Step S103. On the other hand, in the case of the information acquisition frame, the processing proceeds to Step S104.

Step S103:
Based on the information registration frame, the processing unit 21 registers the information of the source communication device 1 on the node information table 22. After that, the processing proceeds to Step S105.

Step S104:
The processing unit 21 obtains information corresponding to requirement by the information acquisition frame from the node information table 22. After that, the processing proceeds to Step S105.

Step S105:
The processing unit 21 generates a reply frame 10 (control frame 11). In the case where the above-mentioned Step S104 is performed, the processing unit 21 incorporate the information obtained from the node information table 22 into the reply frame 10. Then, the processing unit 21 outputs the reply frame 10 to the transmission unit 23. The transmission unit 23 transmits the reply frame 10 to the gateway 3 on the side of the source communication device 1.

Step S106:
On the other hand, if the destination is the communication device 1, the processing unit 21 changes a destination MAC address of the frame 10 by referring to the node information table 22. Then, the processing unit 21 outputs the frame 10 to the transmission unit 23.

Step S107:
The transmission unit 23 transmits the frame 10 to the gateway 3 on the side of the destination communication device 1.

3. Modification Example

Figure 5:
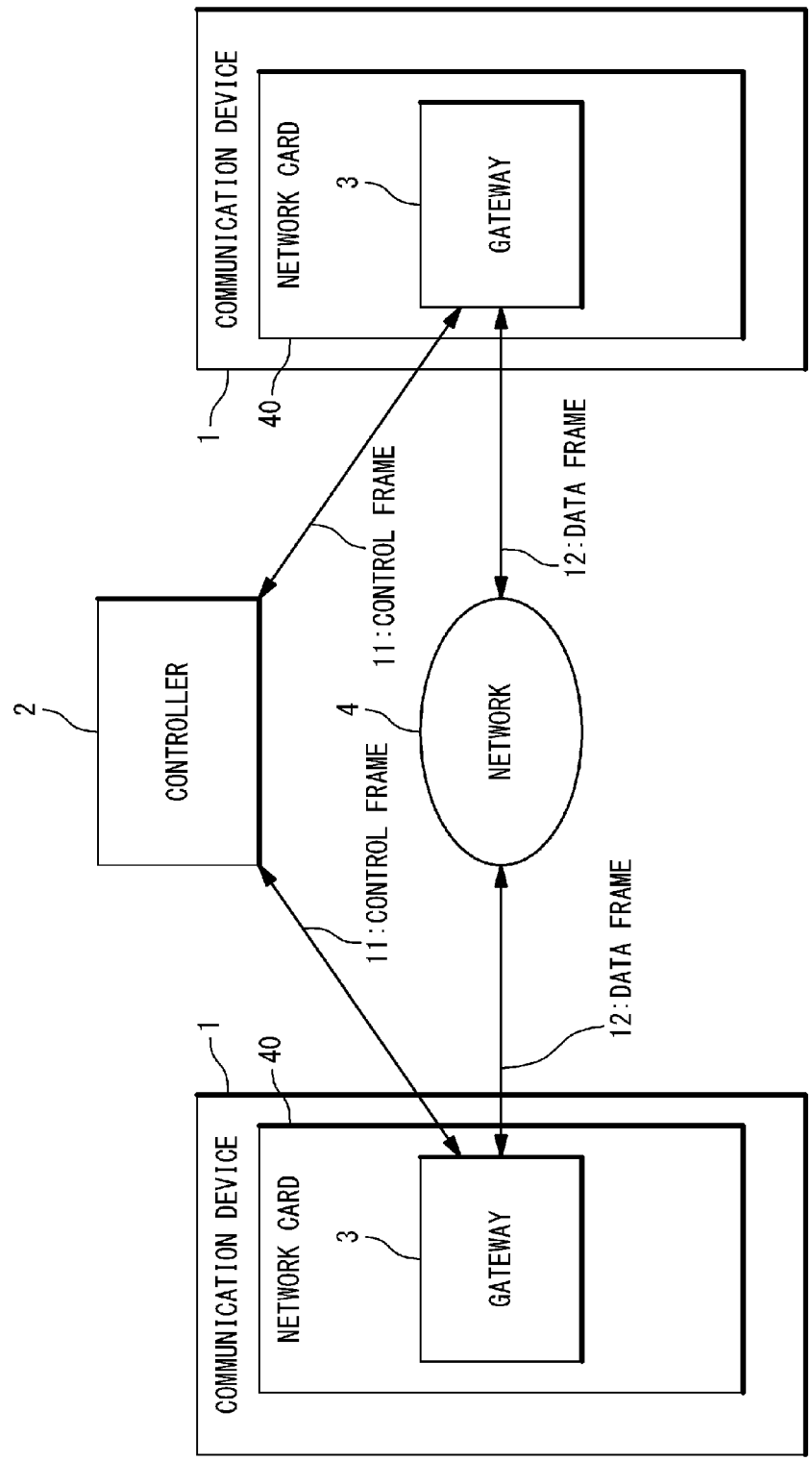
FIG. 5 is a block diagram showing a modification example of the network system according to the exemplary embodiment of the present invention.

FIG. 5 is a block diagram showing a modification example of the network system according to the present exemplary embodiment. According to the present modification example, the gateway 3 is built in a network device within the communication device 1. More specifically, the communication device 1 has a network card 40, and the gateway 3 is built in the network card 40. The gateway 3 in FIG. 5 is the same as the gateway 3 in FIG. 1 except for the installation location. According to the present modification example, functions are concentrated in the communication device 1 and thus the network flexibility is expected to be further improved.

Figure 6:
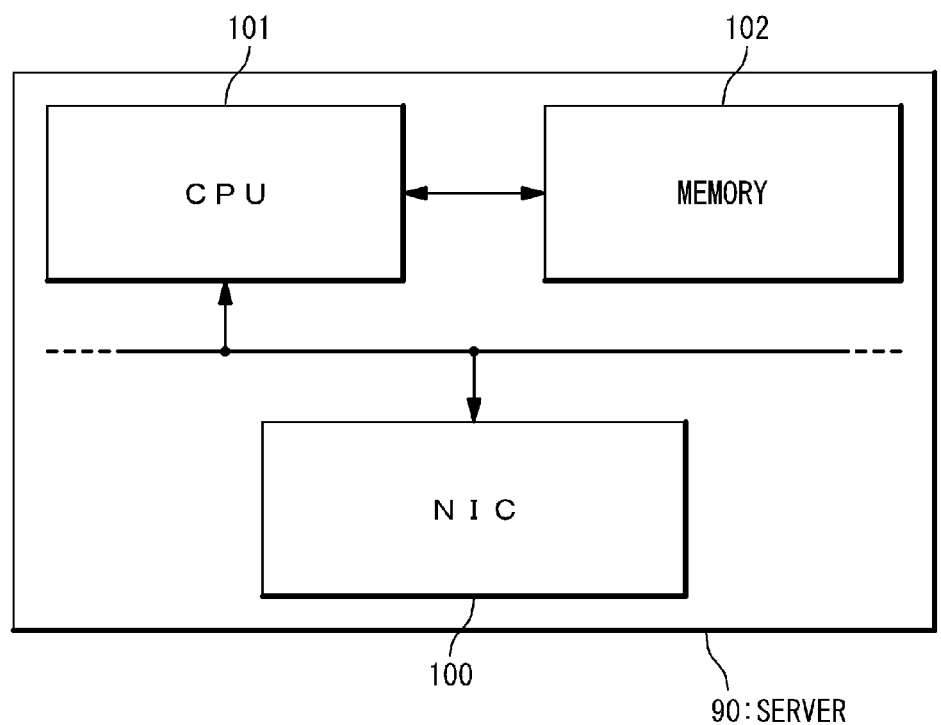
FIG. 6 is a block diagram showing a hardware configuration example of the controller according to the exemplary embodiment of the present invention.

FIG. 6 is a block diagram showing a hardware configuration example of the controller 2 according to the present exemplary embodiment. The functions of the controller 2 are implemented in a single server 90. The server 90 has a network interface card (NIC) 100, a processor (CPU) 101 and a memory 102. The functions of the controller 2 are achieved by cooperation of the hardware and a computer program. More specifically, the network interface card 100 that transmits and receives the frames 10 functions as the above-described reception unit 20 and transmission unit 23. The processor 101 that performs the frame processing functions as the above-described processing unit 21. The above-described node information table 22 is stored in the memory 102. It should be noted that the computer program that realizes the functions of the controller 2 may be recorded on a tangible computer-readable recording medium.

Figure 12:
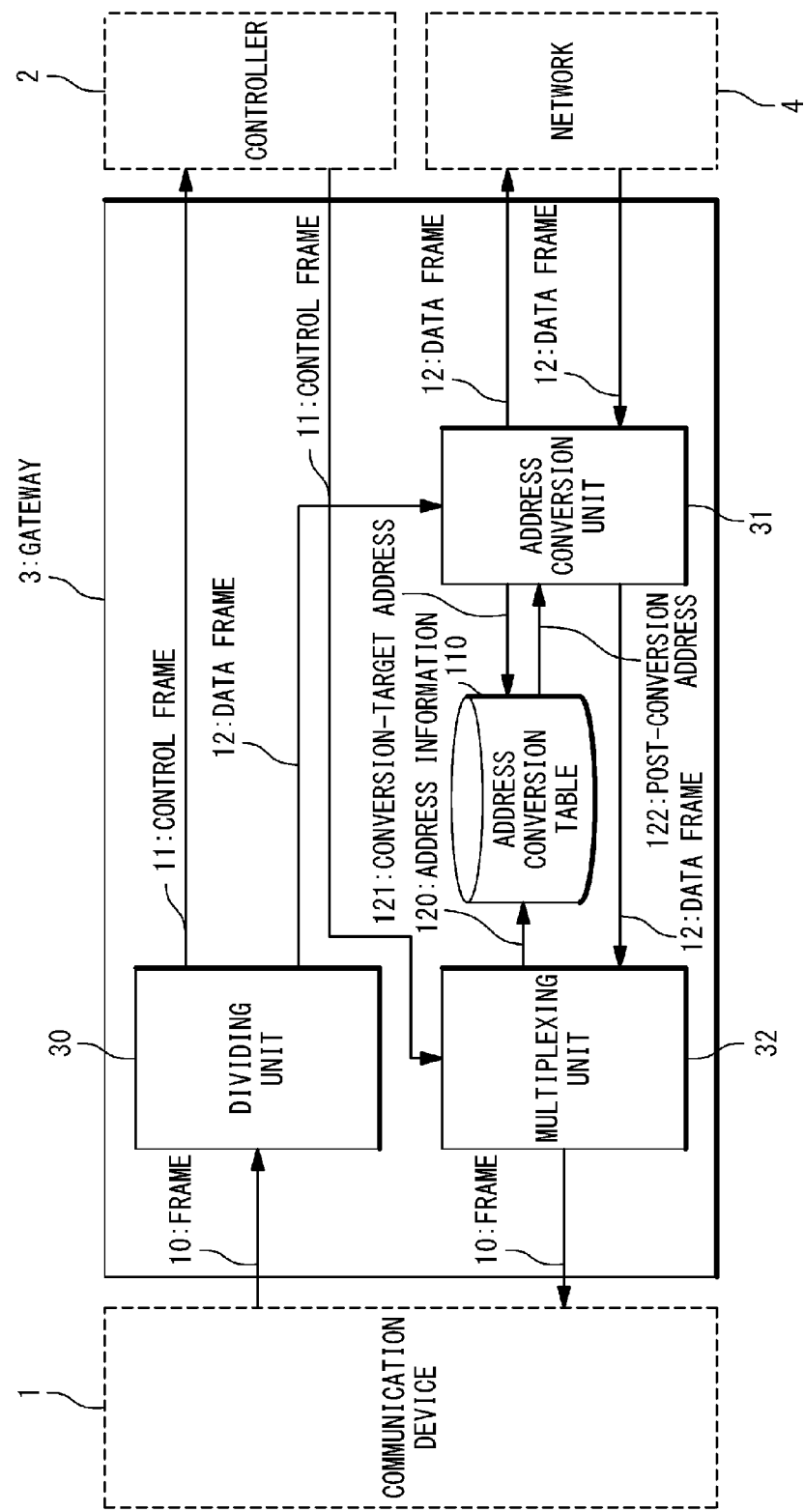
FIG. 12 is a block diagram showing a modification example of the gateway according to the exemplary embodiment of the present invention.

FIG. 12 is a block diagram showing a modification example of the gateway 3 according to the present exemplary embodiment. In this modification example, the gateway 3 is further provided with an address conversion table 110. The multiplexing unit 32 of the gateway 3 in the present modification example transmits to the address conversion table 110 appropriate address information 120 extracted from the control frame 11 transmitted from the controller 2. Based on the address information 120 transmitted from the multiplexing unit 32, the address conversion table 110 configures a table that indicates a correspondence relationship between a conversion-target address 121 and a post-conversion address 122 with respect to each communication device 1. FIG. 13 shows a configuration example of the address conversion table 110. Due to addition of the address conversion table 110, the address conversion unit 31 can perform the address conversion for the data frame 12 by referring to the address conversion table 110. According to the present modification example, the address conversion is possible even in a case where the post-conversion address cannot be generated from the information of the frame 10. Therefore, versatility of the present exemplary embodiment is expected to further increase.

4. Application to FCoE

Next, let us consider a case where the present exemplary embodiment is applied to the FCoE.

Figure 7:
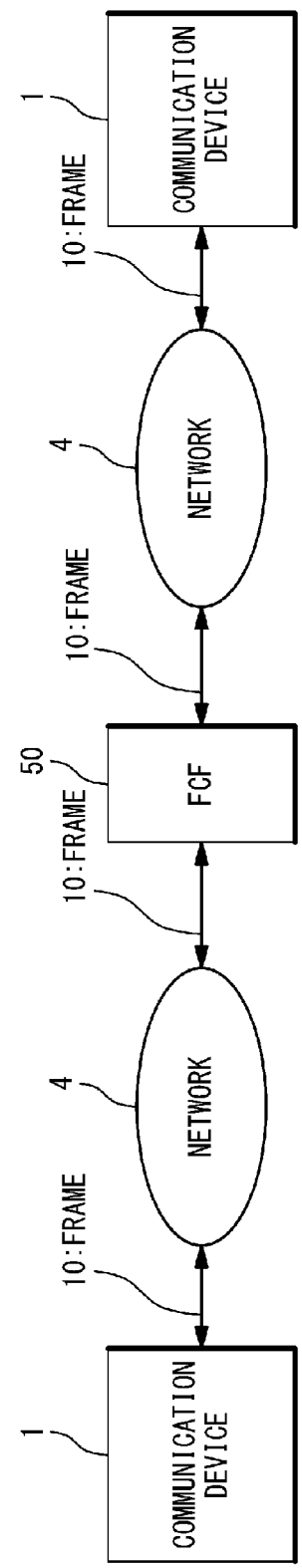
FIG. 7 is a block diagram showing a configuration of a typical FCoE communication network.

FIG. 7 is a block diagram showing a configuration of a typical FCoE communication network. The communication device 1 that performs the frame communication based on the FCoE is connected to an FCF (FCoE Forwarder) 50 through the network 4 configured by links that support the FCoE. The FCF 50 is a switch for use in the FCoE communication. Currently, the FCoE communication is invariably required to go through the FCF 50.

Figure 8:
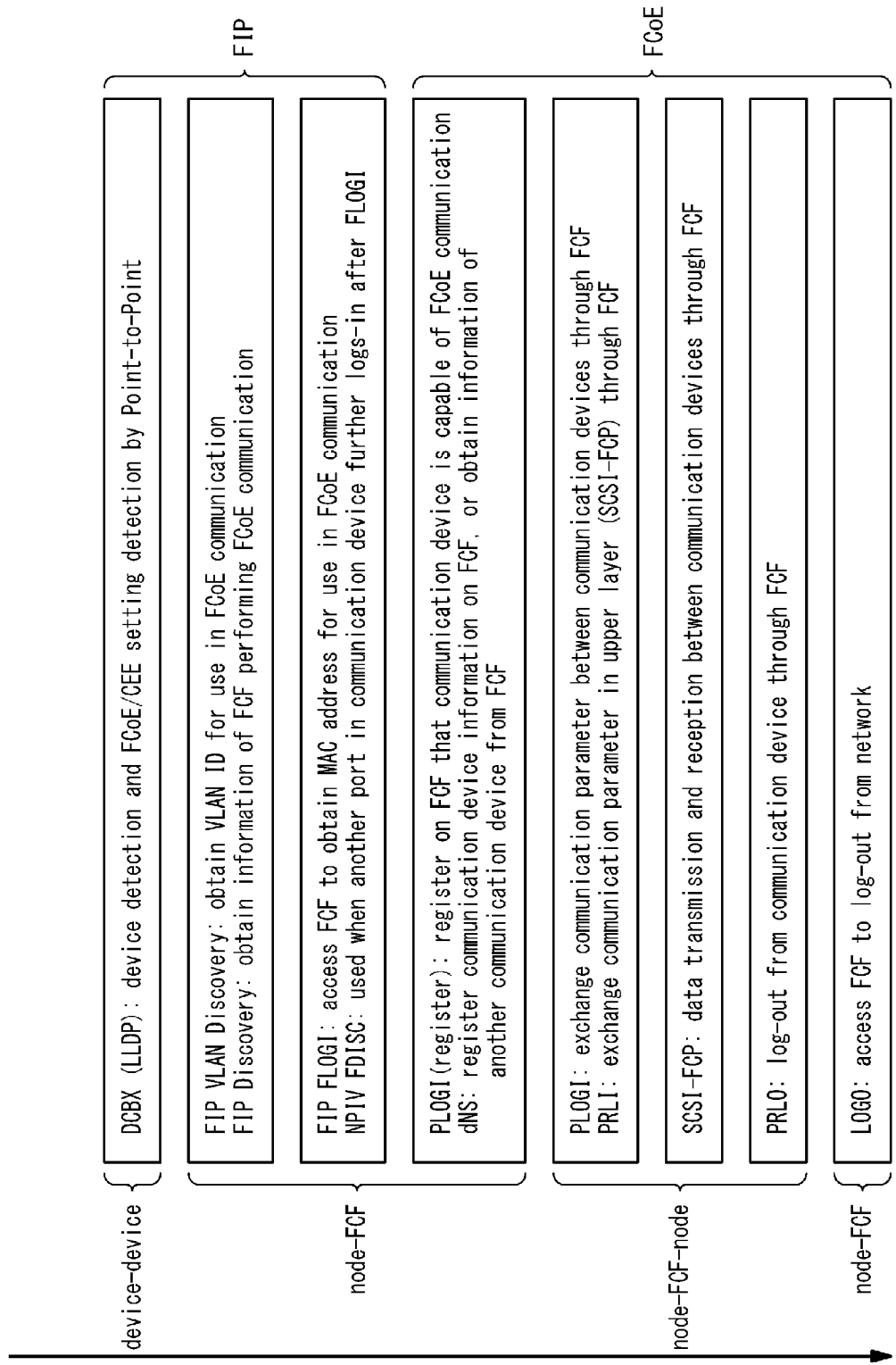
FIG. 8 is a classification diagram of frames used in the typical FCoE communication.

FIG. 8 is a classification diagram of frames used in the typical FCoE communication. Respective frames will be described in order.

1. DCBX (LLDP): exchange information on extension functions used in the Ethernet communication network for performing the FCoE communication, between links.
2. FIP VLAN Discovery: the communication device obtains a VLAN ID for use in the FCoE communication from the FCF.
3. FIP Discovery: the communication device obtains a MAC address of the FCF for use in the FCoE communication from the FCF.
4. FIP FLOGI: the communication device accesses the FCF to obtain a MAC address of itself for use in the FCoE communication.
5. PLOGI: the communication device exchanges information for the FCoE communication with the FCF and the destination communication device through the FCF.
6. PRLI: the communication device exchanges information for data communication with the destination communication device through the FCF.
7. SCSI-FCP: the communication device communicates with the destination communication device through the FCF.
8. PRLO: the communication device cuts off connection between the communication devices (deletes information) through the FCF.
9. LOGO: the communication device accesses the FCF to cut off the connection between the FCF and the communication device (deletes information).

The "SCSI-FCP frame" among the above corresponds to the data frame 12, whose amount of information is much larger than that of the other types of frames. In the case of the typical FCoE communication network shown in FIG. 7, all the frames including the SCSI-FCP frames go through the FCF 50. Therefore, a transfer time of the SCSI-FCP frames greatly affects the network performance.

An operation in a case where the present exemplary embodiment is applied to the FCoE is as follows.

First, an operation of the gateway 3 will be described. The gateway 3 determines whether the received frame 10 is a control frame 11 or a data frame 12. The control frame 11 is a frame for exchanging information required for accessing the destination communication device 1. On the other hand, the data frame 12 is a frame for data transmission and reception between the communication devices 1. Among the frames shown in FIG. 8, the "SCSI-FCP" is determined to be the data frame 12 and the rest frame is determined to be the control frame 11.

Figure 9:
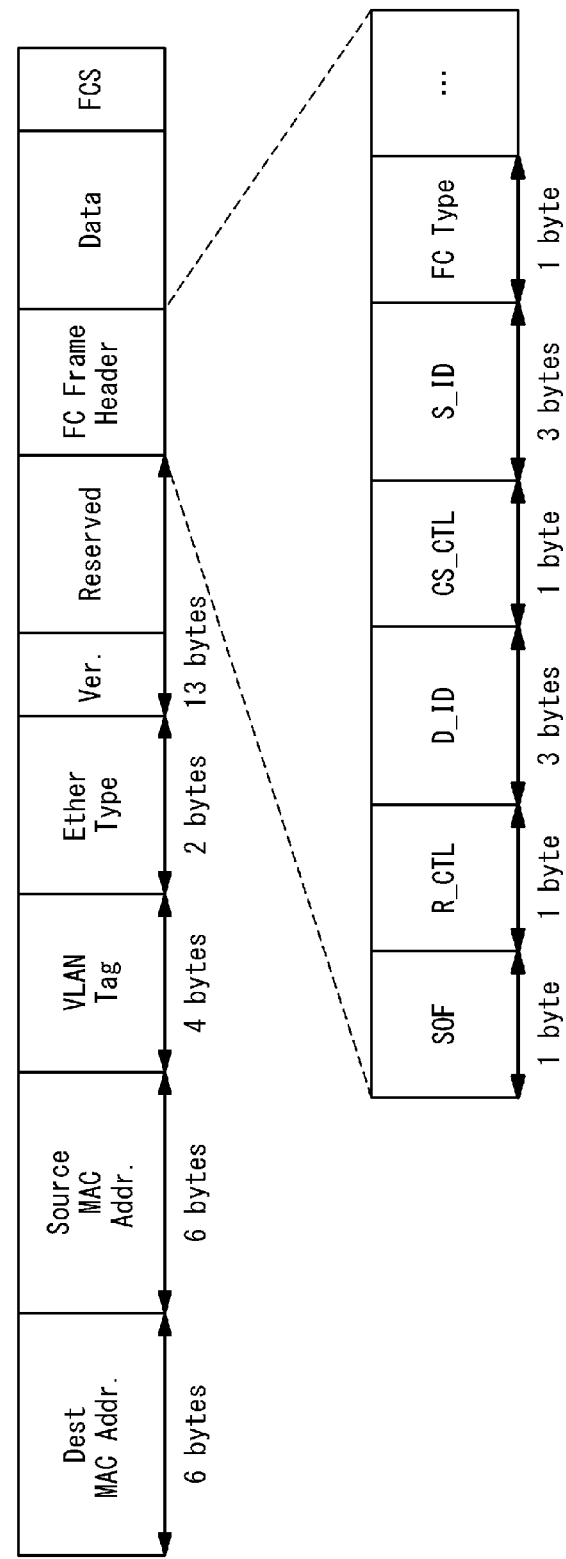
FIG. 9 is a conceptual diagram showing a structure of a SCSI-FCP frame in the typical FCoE communication.

The gateway 3 can determine the frame type by the following method, for example. FIG. 9 is a conceptual diagram showing a structure of the SCSI-FCP frame. As shown in FIG. 9, there is an element "FC Type: FCP" in the FC Field in the FCoE Field. A point with which the SCSI-FCP frame can be clearly distinguished from the other frames is the "FC Type". Therefore, the gateway 3 can determine whether the received frame 10 is the control frame 11 or the data frame 12 by referring to the "FC Type" of the frame 10.

Moreover, the gateway 3 changes the destination MAC address of the frame 10, as necessary. The reason is as follows. In the case of the conventional FCoE communication, both of the control frame and the data frame go through the FCF 50. Therefore, the source communication device 1, which may not know a MAC address of the destination communication device 1, tentatively sets the destination MAC address to a MAC address of the FCF 50, and the FCF 50 converts the destination MAC address. However, according to the present exemplary embodiment, the data frame 12 does not go through the controller 2. Since the communication device 1 sets the destination MAC address of the transmission frame 10 to a MAC address of the controller 2, the network 4 cannot transfer the data frame 12 to the destination communication device 1, as long as the conversion of the destination MAC address is not performed in the gateway 3. Therefore, in order that the data frame 12 is transferred to the correct destination, the gateway 3 converts the destination MAC address of the data frame 12 into a MAC address of the destination communication device 1 and then outputs the data frame 12 to the network 4.

The MAC address used in the conventional FCoE communication is not a MAC address that the communication device 1 originally owns but is a MAC address that is dedicated to the FCoE communication and distributed by the FCF 50. There is a rule for allocation of the MAC address that is distributed. That is, the upper 3 bytes of the 6 bytes MAC address are fixed while the lower 3 bytes thereof are variable. The lower 3 bytes are used as an address of the communication device in the FC frame that is encapsulated to be the FCoE frame. In the case of the conventional FCOE communication, when the communication device 1 transmits the frame 10 to the destination communication device 1, the MAC address is set to the MAC address of the FCF 50 and a destination address of the FC frame is set to an address of the destination communication device 1. Therefore, with regard to the frame 10 that is determined to be the data frame 12, the gateway 3 can obtain the MAC address of the destination communication device 1 in accordance with the above-described rule by analyzing the destination address of the encapsulated FC frame.

In this manner, the data frames 12 are transferred to the destination communication device 1 through the network 4 and without through the controller 2.

Next, an operation of the controller 2 will be described. The controller 2 is in charge of the processing with respect to the control frames 11 (i.e. other than SCSI-FCP being the data frame 12) that the conventional FCF 50 has performed.

Figure 10:
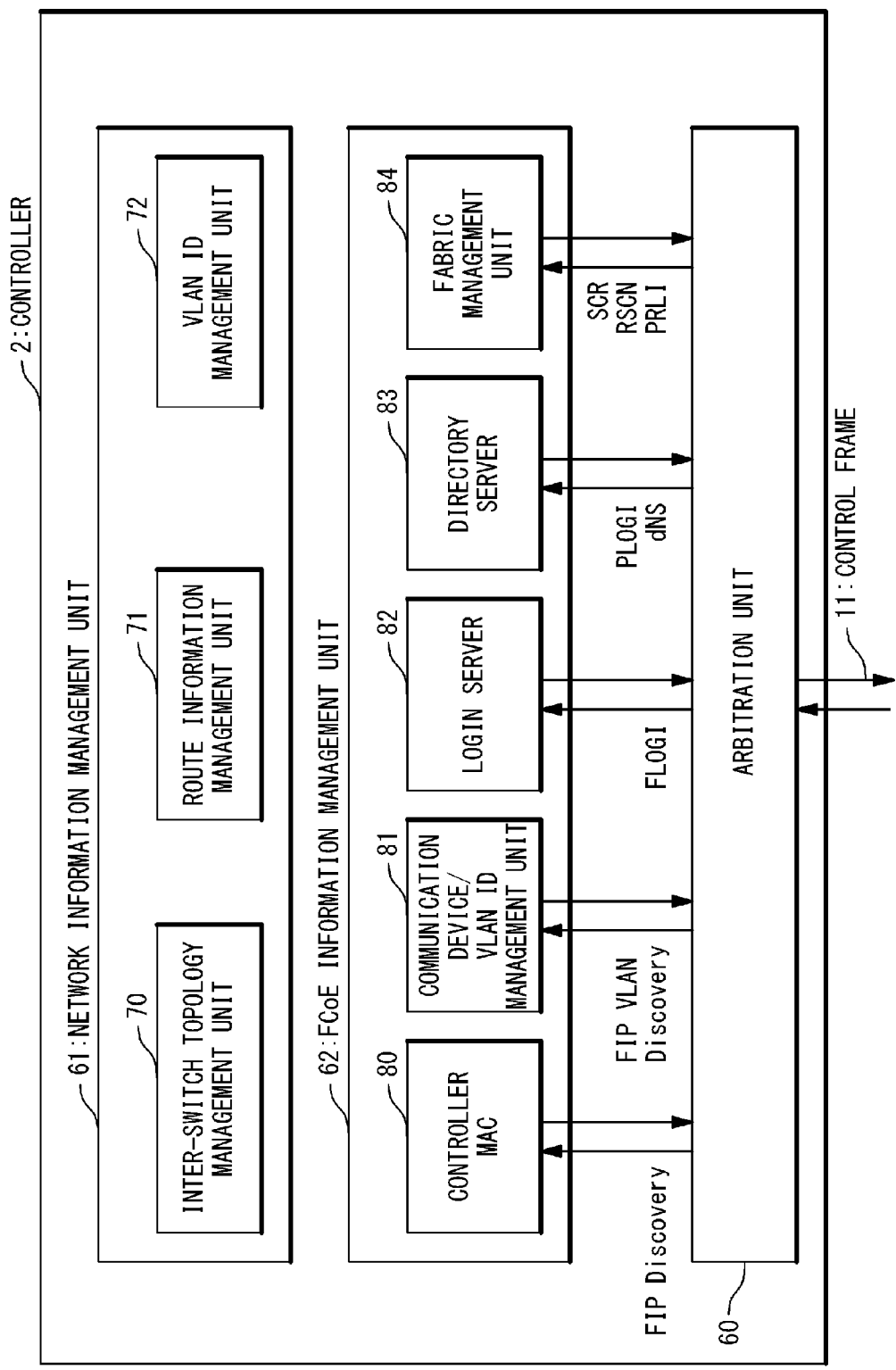
FIG. 10 is a block diagram showing a configuration of a controller in a case where the present invention is applied to the FCoE communication.

FIG. 10 is a block diagram showing a configuration of the controller 2 in the case where the present exemplary embodiment is applied to the FCoE communication. As shown in FIG. 10, the controller 2 has an arbitration unit 60, a network information management unit 61 and an FCoE information management unit 62.

The arbitration unit 60 determines the type of frame that arrives at the controller 2 and forwards the frame to each information management unit (61, 62). Also, the arbitration unit 60 obtains construction information for use in a frame for transmission from each information management unit (61, 62) and transmits the generated frame to the gateway 3.

The network information management unit 61 has an inter-switch topology management unit 70, a route information management unit 71 and a VLAN ID management unit 72.

The inter-switch topology management unit 70 recognizes and manages port connection information of each switch in the network 4.

The route information management unit 71 manages a route between the communication devices 1 that is known in the inter-switch topology management unit 70. Also, when receiving a setting request for a route between a new pair of communication devices 1 from the FCoE information management unit 62, the route information management unit 71 reflects the route information in each switch.

The VLAN ID management unit 72 manages giving of a VLAN ID to a port of a switch. Also, the VLAN ID management unit 72 searches for a VLAN ID and send a reply, in response to a search request from the FCoE information management unit 62.

The FCoE information management unit 62 has a controller MAC 80, a communication device/VLAN ID management unit 81, a login server 82, a directory server 83 and a fabric management unit 84.

The controller MAC 80 manages a MAC address for use in communication with the FCoE information management unit 62. The controller MAC 80 replies the MAC address of the controller 2, in response to the FIP Discovery from the communication device 1.

The communication device/VLAN ID management unit 81 manages the VLAN ID to which the communication device 1 belongs. The communication device/VLAN ID management unit 81 replies the VLAN ID to which the FCoE network belongs, in response to the FIP VLAN Discovery from the communication device 1.

The login server 82 manages a physical MAC address of the communication device 1 that is notified by the FLOGI for the purpose of management of the communication device 1.

The directory server 83 manages WWPN (World Wide Port Name) and WWNN (World Wide Node Name) which are information of each port of the communication device 1 after the FLOGI and a service class of FC that can be supported. Also, the directory server 73 replies to an inquiry from the communication device 1 due to the dNS.

The fabric management unit 84 manages a port status of the communication device 1. When a status change (validation/invalidation of port, entry/withdrawal of port to/from fabric) occurs, the fabric management unit 84 notifies another node of it (RSCN/SCR).

Figure 11:
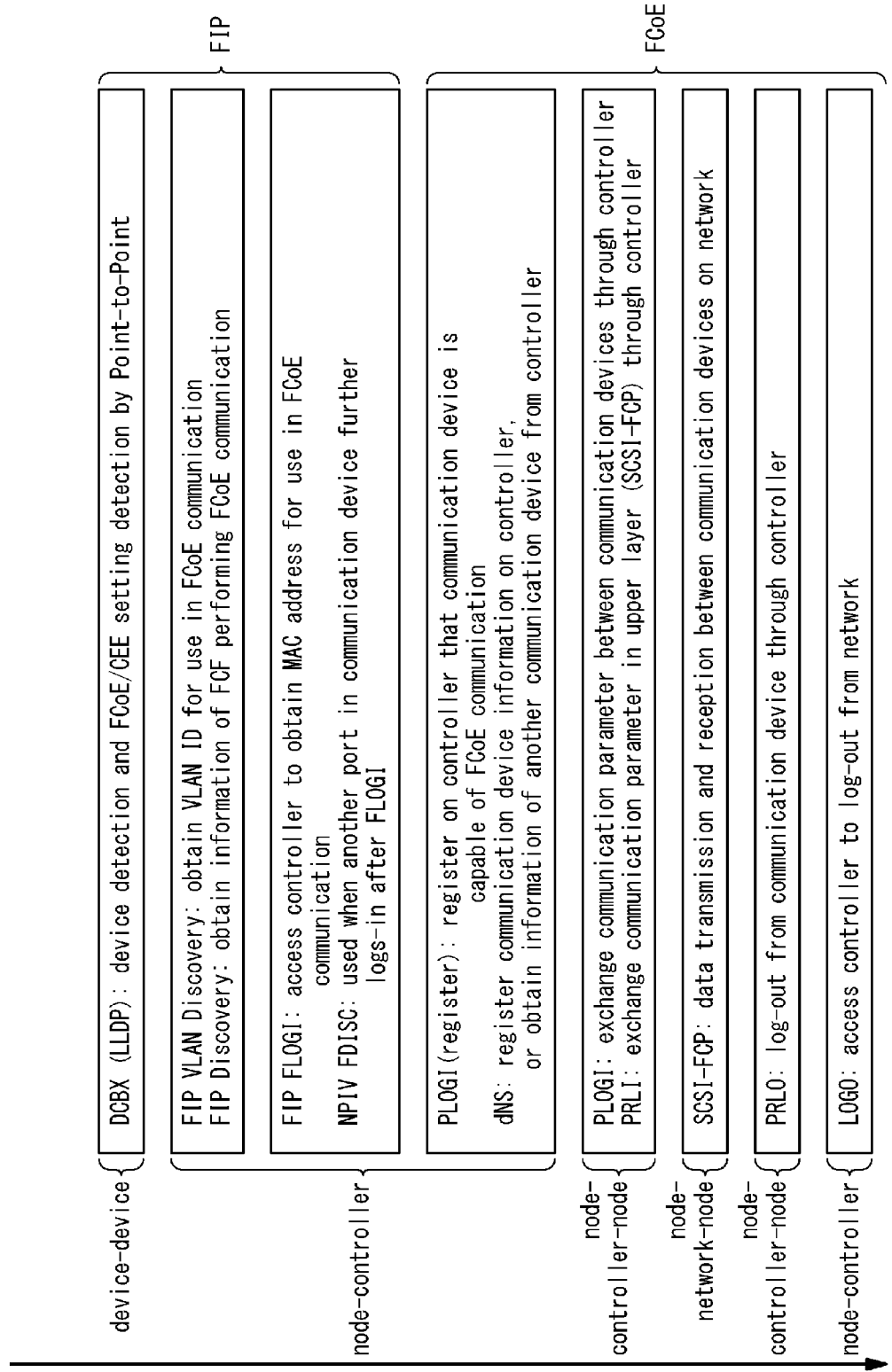
FIG. 11 is a classification diagram of frames in the case where the present invention is applied to the FCoE communication.

FIG. 11 is a classification diagram of frames in the case where the present exemplary embodiment is applied to the FCoE communication. Respective frames will be described in order.

1. DCBX (LLDP): exchange information on extension functions used in the Ethernet communication network for performing the FCoE communication, between links.

2. FIP VLAN Discovery: the communication device 1 obtains a VLAN ID for use in the FCoE communication from the controller 2.

3. FIP Discovery: the communication device 1 obtains a MAC address of the controller 2 for use in the FCoE communication from the controller 2.

4. FIP FLOGI: the communication device 1 accesses the controller 2 to obtain a MAC address of itself for use in the FCoE communication.

5. PLOGI: the communication device 1 exchanges information for the FCoE communication with the controller 2 and the destination communication device 1 through the controller 2.

6. PRLI: the communication device 1 exchanges information for data communication with the destination communication device 1 through the controller 2.

7. SCSI-FCP: the communication device 1 communicates with the destination communication device 1 through the network 4.

8. PRLO: the communication device 1 cuts off connection between the communication devices 1 (deletes information) through the controller 2.

9. LOGO: the communication device 1 accesses the controller 2 to cut off the connection between the controller 2 and the communication device 1 (deletes information).

When the present exemplary embodiment is applied to the FCoE communication, as described above, the SCSI-FCP frame as the data frame 12 is separated from the other frames. Then, the SCSI-FCP frame is transferred only by the Ethernet network 4 without through the FCF. Since the SCSI-FCP frames, which greatly contribute to the network performance, need not to go through a specific route, the network performance is increased. Moreover, since a communication device used in the existing Ethernet can be used as well, the network integration becomes easier.

While the exemplary embodiments of the present invention have been described above with reference to the attached drawings, the present invention is not limited to these exemplary embodiments and can be modified as appropriate by those skilled in the art without departing from the spirit and scope of the present invention.

While a part of or whole of the above-described exemplary embodiments may be described as the following Supplementary notes, it is not limited to that.

(Supplementary Note 1)

A network system comprising:

a communication device configured to perform transmission and reception of a frame;

a network configured to transfer said frame;

a gateway connected between said communication device and said network; and a controller configured to perform management of said communication device and said network, wherein said frame is classified into a control frame for communicating control information necessary for communication and a data frame for communicating data between communication devices, wherein said gateway determines whether a frame received from said communication device as a source is said control frame or said data frame, forwards said control frame to said controller, and forwards said data frame to said network, wherein said controller performs said management based on said control frame received from said gateway, and wherein said network transfers said data frame received from said gateway to said communication device as a destination without through said controller.

(Supplementary Note 2)

The network system according to the Supplementary note 1, wherein said source communication device sets a destination MAC address of said frame to a MAC address of said controller, and wherein when said received frame is said data frame, said gateway converts the destination MAC address of said data frame into a MAC address of said destination communication device and then outputs said data frame to said network.

(Supplementary Note 3)

The network system according to Supplementary note 1 or 2, wherein said gateway is built in a network card of said communication device.

(Supplementary Note 4)

The network system according to any one of the Supplementary notes 1 and 3, wherein said communication device performs communication based on FCoE (Fibre Channel Over Ethernet), and wherein said gateway determines an FCP frame as said data frame and determines the rest frame as said control frame.

(Supplementary Note 5)

A frame communication method in a network system, wherein said network system comprises:

a communication device configured to perform transmission and reception of a frame;

a network configured to transfer said frame; and a controller configured to perform management of said communication device and said network, wherein said frame is classified into a control frame for communicating control information necessary for communication and a data frame for communicating data between communication devices, wherein said frame communication method comprises:

determining whether a frame transmitted from said communication device as a source is said control frame or said data frame;

forwarding said control frame to said controller and performing, in said controller, said management based on said control frame; and forwarding said data frame to said network and transferring said data frame to said communication device as a destination without through said controller.

This application is based upon and claims the benefit of priority from Japanese patent application No. 2010-208048, filed on Sep. 16, 2010, the disclosure of which is incorporated herein in its entirely by reference.

EXPLANATION OF REFERENCE NUMERALS 1 communication device
2 controller
3 gateway 3
4 network
10 frame
11 control frame
12 data frame
20 reception unit
21 processing unit
22 node information table
23 transmission unit
30 dividing unit
31 address conversion unit
32 multiplexing unit
40 network card
50 FCF
60 arbitration unit
61 network information management unit
62 FCoE information management unit
70 inter-switch topology management unit
71 route information management unit
72 VLAN ID management unit
80 controller MAC
81 communication device/VLAN ID management unit
82 login server
83 directory server
84 fabric management unit
90 server
100 NIC
101 CPU
102 memory
110 address conversion table
120 address information
121 conversion-target address
122 post-conversion address

The invention claimed is:

1. A network system comprising: a communication device configured to perform transmission and reception of a frame; a network configured to transfer said frame; a gateway connected between said communication device and said network; and a controller configured to perform management of said communication device and said network, wherein said frame is classified into a control frame for communicating control information necessary for communication and a data frame for communicating data between communication devices, wherein said gateway determines whether a frame received from said communication device as a source comprises said control frame or said data frame, forwards said control frame to said controller, and forwards said data frame to said network, wherein said controller performs said management based on said control frame received from said gateway, and wherein said network transfers said data frame received from said gateway to said communication device as a destination without passing through said controller;

wherein a source communication device sets a destination MAC address of said received frame to a MAC address of said controller, and wherein when said received frame comprises said data frame, said gateway converts the destination MAC address of said data frame into a MAC address of a destination communication device and then outputs said data frame to said network.

2. The network system according to claim 1, wherein said gateway is built in a network card of said communication device.

3. The network system according to claim 1, wherein said communication device performs communication based on FCoE (Fibre Channel Over Ethernet), and wherein said gateway determines a Fibre Channel Protocol for Small Computer System Interface (SCSI) (FCP) frame as said data frame and determines a remainder of said frame as said control frame.

4. A frame communication method in a network system including a communication device configured to perform transmission and reception of a frame, a network configured to transfer said frame, and a controller configured to perform management of said communication device and said network, said frame communication method comprising:

determining whether a frame received from a source communication device comprises a control frame for communicating control information necessary for communication or comprises a data frame for communicating data between communication devices;

forwarding, if said frame received from said source communication device is determined to comprise a control frame, said received frame to said controller and performing, in said controller, a management based on a content of said control frame; and forwarding, if said frame received from said source communication device is determined to comprise a data frame, said received frame to said network and transferring said data frame to a destination communication device without passing through said controller;

wherein a source communication device sets a destination MAC address of said received frame to a MAC address of said controller, and wherein when said received frame comprises said data frame, a gateway converts the destination MAC address of said data frame into a MAC address of a destination communication device and then outputs said data frame to said network.

* * * * *